United States Patent [19]

Stout et al.

[11] E Re. 31,563

[45] Reissued Apr. 24, 1984

[54] HYDRO-SKI CRAFT WITH LONGITUDINAL FLAPS

[75] Inventors: Ernest G. Stout, Glendale; Francis L. Thornburg, Canoga Park, both of Calif.

[73] Assignee: Lockheed Corporation, Burbank, Calif.

[21] Appl. No.: 374,663

[22] Filed: May 4, 1982

Related U.S. Patent Documents

Reissue of:

[64] Patent No.: 4,067,286
Issued: Jan. 10, 1978
Appl. No.: 550,564
Filed: Feb. 18, 1975

[51] Int. Cl.[3] ..... B63B 1/20
[52] U.S. Cl. ..... 114/283; 114/284
[58] Field of Search ..... 114/61, 67 A, 271, 283, 114/284, 285; 244/205

[56] References Cited

U.S. PATENT DOCUMENTS

| | | | |
|---|---|---|---|
| 2,647,709 | 8/1953 | Doolittle et al. | 114/285 X |
| 2,676,771 | 4/1954 | Mayo | 244/105 |
| 2,753,135 | 7/1956 | Gouge | 114/284 X |
| 2,919,669 | 1/1960 | Kikuhara | 114/284 |
| 3,146,752 | 9/1964 | Ford | 114/67 A |
| 3,267,898 | 8/1966 | Evans | 114/67 A |
| 3,308,780 | 3/1967 | Abramson | 114/283 |
| 3,401,663 | 9/1968 | Yost | 114/283 |
| 3,707,936 | 1/1973 | Harris | 114/285 |

*Primary Examiner*—Sherman D. Basinger
*Attorney, Agent, or Firm*—Lowell G. Turner

[57] ABSTRACT

A hydro-ski craft in which load alleviation is attained by reducing the effective wetted area of the planing surfaces at high speeds, and in which elongated flaps extending longitudinally of the craft are mounted to swing about longitudinal axes between generally horizontal planing positions and upwardly swung retracted positions. Spray control dams may be carried by the flaps to themselves automatically swing between inactive and active positions in response to upward swinging movement of the flaps.

24 Claims, 12 Drawing Figures

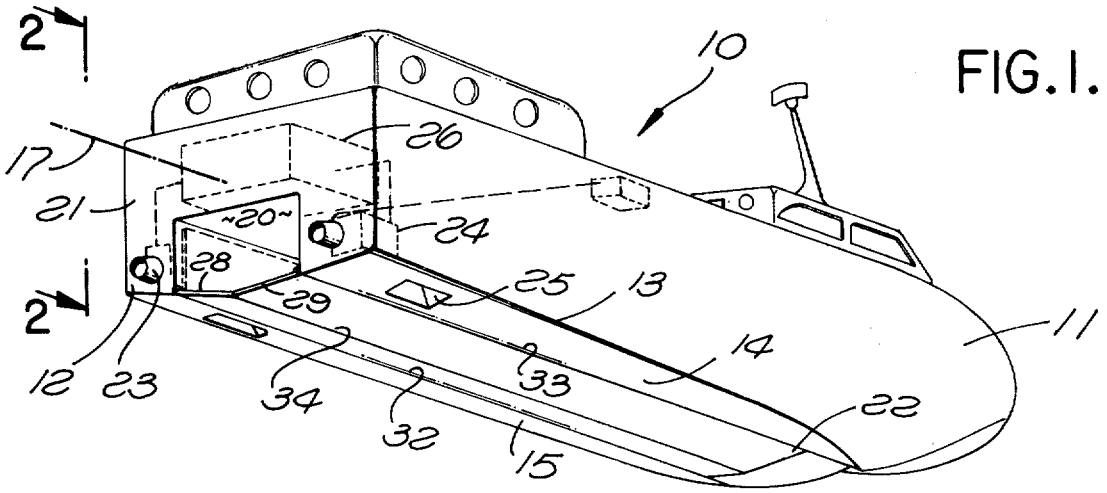
FIG. 1.
FIG. 2.
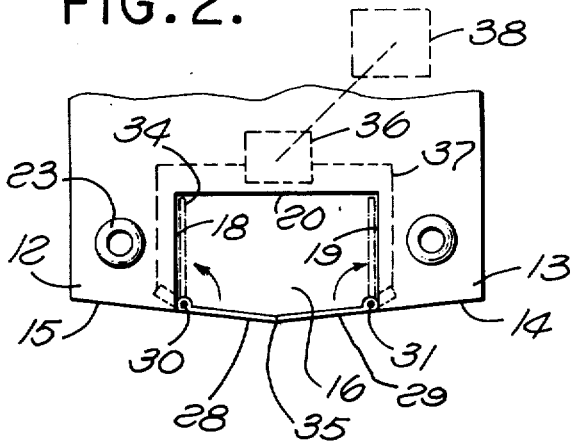
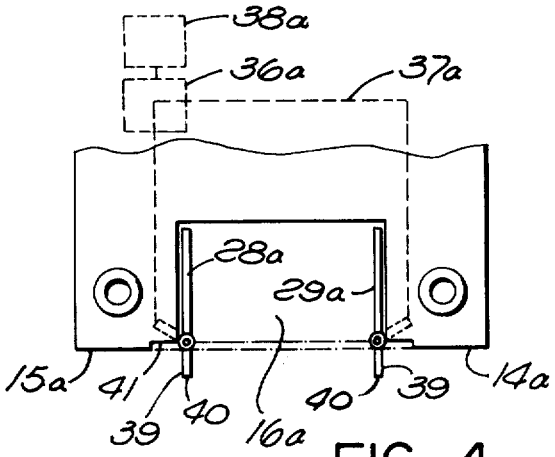
FIG. 4.
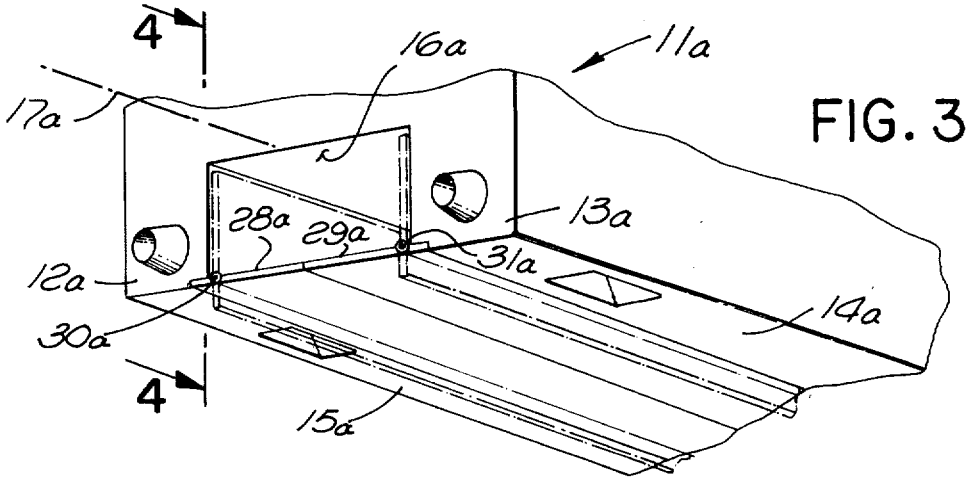
FIG. 3.

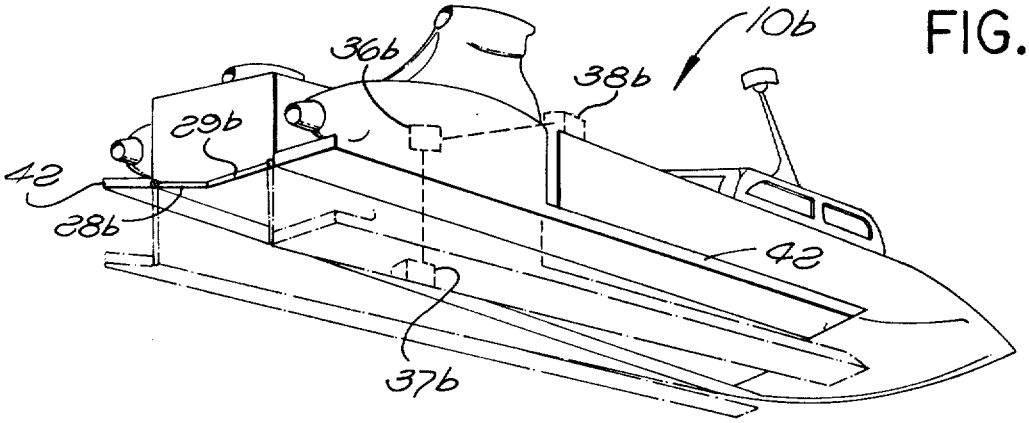
FIG.5.
FIG.6.
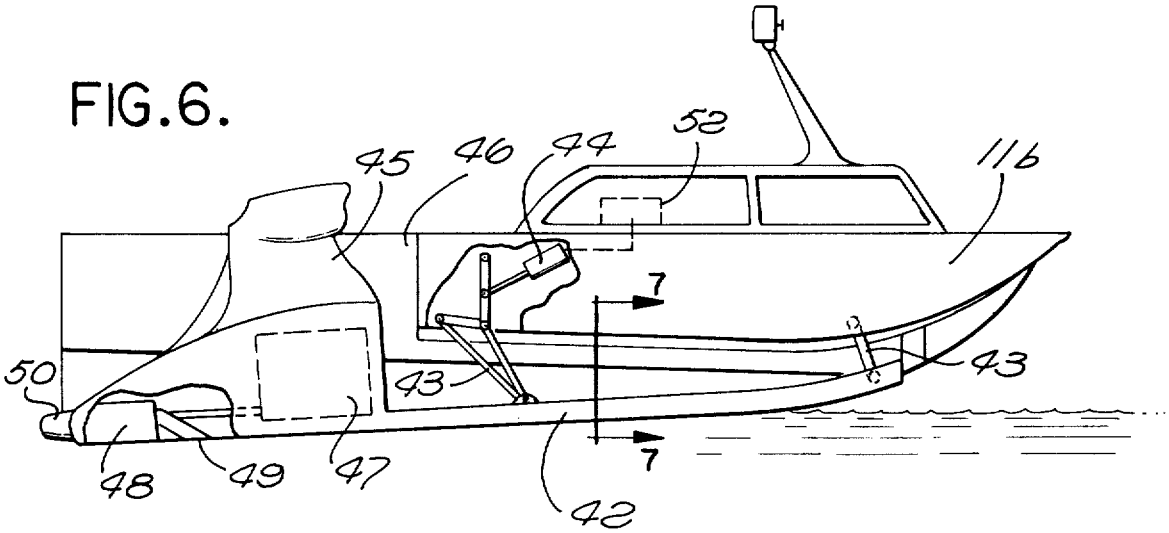
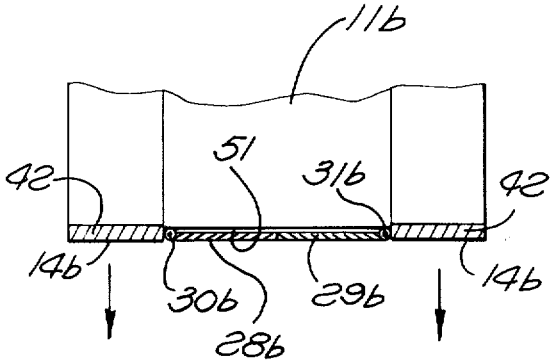
FIG. 7.
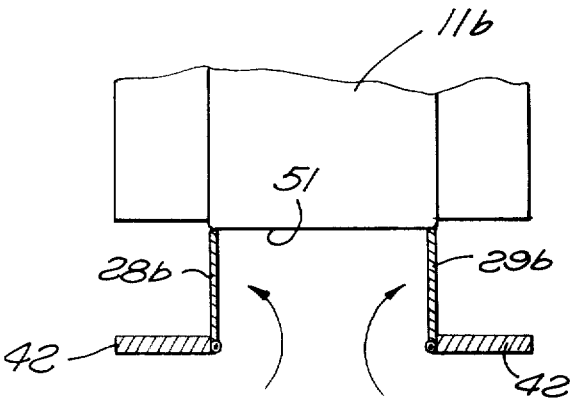
FIG.8.

10c
44c
42c
62
57
11c
10
11
12
56
53
54
55
58
59
60
61

HYDRO-SKI CRAFT WITH LONGITUDINAL FLAPS

Matter enclosed in heavy brackets [ ] appears in the original patent but forms no part of this reissue specification; matter printed in italics indicates the additions made by reissue.

BACKGROUND OF THE INVENTION

This invention relates to improved hydro-ski craft adapted to plane at high speeds along the surface of a body of water.

As a planing type boat moves along the surface of a body of water, the frictional drag on the boat tends to increase very rapidly as high speeds are attained; and also the susceptibility of the craft to overturning or damage by contact with even minor waves increases drastically. To reduce these adverse effects, there have been devised ski type marine craft which at high speed ride on skis or planing surfaces having a wetted area which is much smaller than the planing area which is in contact with the water at lower speeds. One such hydro-ski craft is shown in U.S. Pat. No. 3,308,780 issued Mar. 14, 1967, which discloses a boat having two skis adapted to be shifted vertically relative to the main hull of the boat between upper retracted positions for low speed travel and downwardly extended positions in which the skis alone support the craft at high speeds, with very effective load alleviation at high speeds as a result of the reduced area of contact of the skis with the water.

There has also been proposed in the past, in U.S. Pat. No. 2,647,709 issued Aug. 4, 1953, a type of landing ski for aircraft in which the effective area of the ski for contacting a body of water or the like can be varied. This landing ski has flaps at its opposite sides which are hinged to swing about longitudinal axes between positions in which the flaps supplement the water contacting area of a main central portion of the ski and retracted positions in which the central portion alone contacts the water or other supporting surface.

SUMMARY OF THE INVENTION

A major purpose of the present invention is to provide improved hydro-ski craft of the above discussed general type in which load alleviation at high speed is attained by provision of planing elements which are shiftable relative to the hull of the craft between active and inactive positions to vary the effective wetted area of the planing surfaces. The shiftable parts of the craft include longitudinal flaps which are hinged to the hull or to skis to swing upwardly and downwardly relative thereto about longitudinal axes. Preferably, there are provided in conjunction with these longitudinal swinging flaps a pair of spray dams projecting to positions in which they block movement of water or spray past the location of the dam and upwardly along a generally vertical surface of the hull, flap or the like. These spray dams are actuable between active and inactive positions, and desirably are operatively connected to the flaps to automatically move the dams to their active positions when the flaps are swung upwardly to their retracted positions.

One form of the invention includes a boat hull which is itself shaped to integrally carry and form two laterally spaced ski [poritions] *portions* of the hull, with a recess extending upwardly into the hull between those skis. In this arrangement, a flap or flaps are provided for bridging across the space between the skis to form a relatively large composite planing surface with the skis for low speed travel. At higher speeds, the flap or flaps swing upwardly relative to the skis to retracted positions.

In a second form of the invention, a pair of skis are mounted to a hull for upward and downward shifting movement between retracted and extended positions, with these skis carrying a pair of longitudinal flaps mounted for movement upwardly and downwardly with the skis and for swinging movement relative thereto about axes extending longitudinally of the boat. In one condition, the flaps may be essentially coplanar with and extend between the two skis, while in another position the flaps may be swung upwardly to essentially vertical positions in which they may assist in blocking off cross flow of water through or past struts or the like which movably connect the skis to the hull of the craft.

It is contemplated that the invention may be applied to buoyant skis or pontoons as well as to skis in which the entire load supporting effect is attained by a planing action. Another form of the invention shown in the drawings utilizes such pontoon type buoyant ski elements, with longitudinal flaps being connected to the pontoons for upward and downward swinging movement, and desirably carrying spray dams as discussed.

BRIEF DESCRIPTION OF THE DRAWINGS

The above and other features and objects of the invention will be better understood from the following detailed description of the typical embodiments illustrated in the accompanying drawings in which:

FIG. 1 is a perspective view of *a* first form of marine craft constructed in accordance with the invention;

FIG. 2 is a rear view taken on line 2—2 of FIG. 1;

FIG. 3 is a fragmentary perspective representation of a variational form of the invention, similar to that of FIG. 1 but having spray dams carried by the shiftable flaps;

FIG. 4 is a fragmentary rear view of the boat of FIG. 3;

FIG. 5 is a perspective view of another form of the invention;

FIG. 6 is a side view of the craft of FIG. 5;

FIG. 7 is a fragmentary vertical view taken on line 7—7 of FIG. 6, with the skis shown in their upwardly retracted positions;

FIG. 8 is a view similar to FIG. 7, but showing the skis shifted downwardly;

DESCRIPTION OF THE PREFERRED EMBODIMENTS

Figures 9, 10, 11, 12:
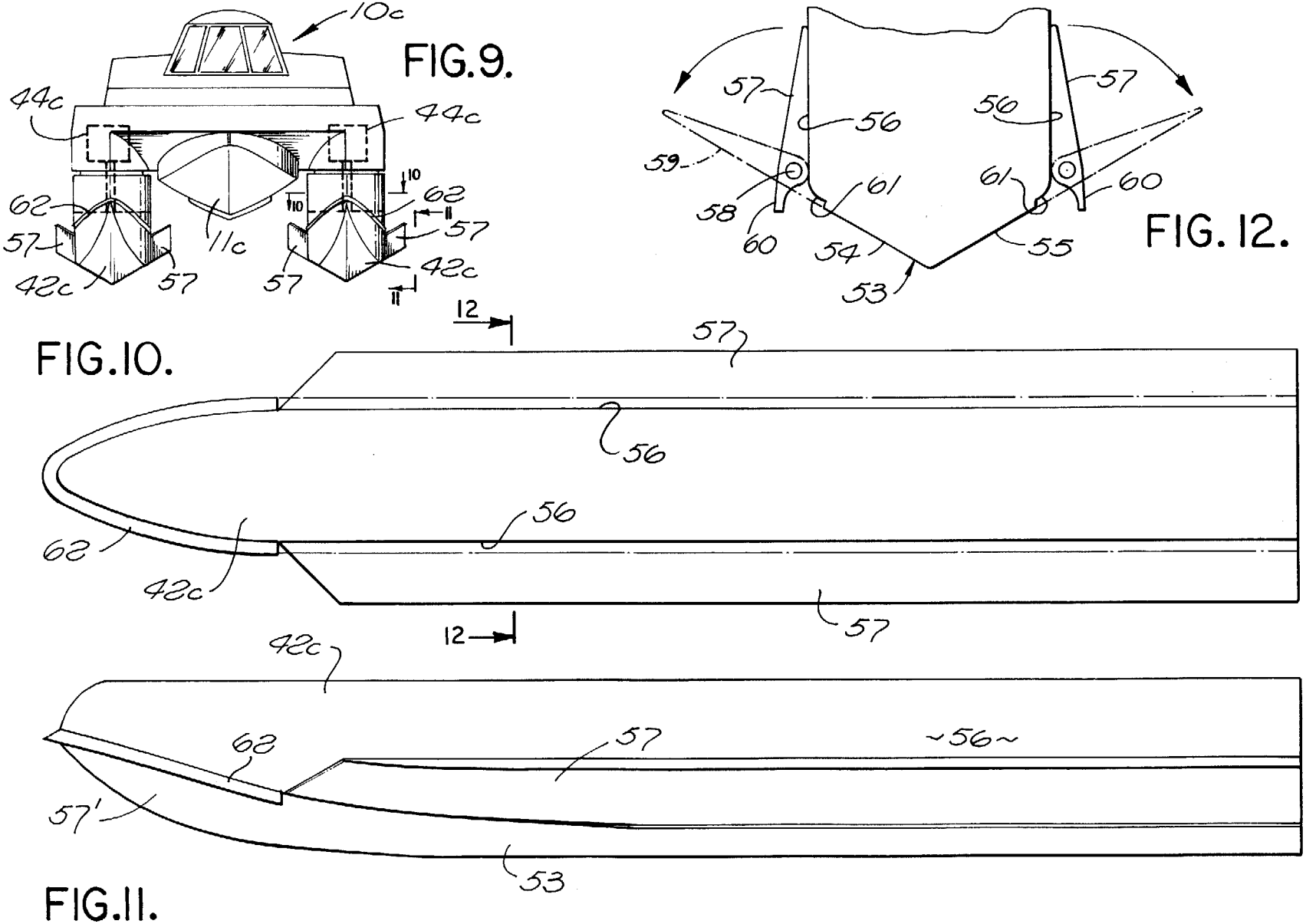
FIG. 9 is a front view of a pontoon type ski craft embodying the invention, with the pontoons in the lowered position.
FIG. 10 is an enlarged plan view of one of the pontoon skis of FIG. 9, taken on line 10—10 of that figure.
FIG. 11 is a side view of the pontoon taken on line 11—11 of FIG. 9.
FIG. 12 is a transverse section taken on line 12—12 of FIG. 10.

Referring first to FIGS. 1 and 2, the boat 10 shown in those figures has a hull 11 containing appropriate passenger and/or cargo spaces and shaped to define at the underside of the hull two laterally spaced skis 12 and 13 formed integrally with the hull. These skis have essentially planar undersurfaces 14 and 15 which may extend approximately horizontally but in the particular arrangement illustrated are slightly inclined to advance upwardly as they advance laterally in opposite directions (see FIG. 2). Between the two skis 12 and 13, the hull is shaped to define an intermediate recess 16, which like the skis 12 and 13 extends longitudinally of the hull, that is, in a front to rear direction defined by the [longitudinally] *longitudinal* axis 17 of the craft. Recess 16 may be of the rectangular cross-section illustrated in FIG. 2, being defined by two parallel vertical inner side walls 18 and 19 of the skis 12 and 13 respectively, and a top planar horizontal wall 20 of the recess. This rectangular cross-section of the recess 16, and the FIG. 2 cross-sections of skis 12 and 13, may all continue and be uniform along the major portion of the length of the boat, and in particular these cross-sections may be uniform from the transverse rear wall 21 of the craft to the location 22 of FIG. 2 near the bow. Forwardly of that location, the hull may be appropriately shaped to present a conventional bow structure to the water.

The boat of FIGS. 1 and 2 is driven through the water by a suitable propulsion system, which preferably includes two jet nozzles 23 carried by the two ski portions 12 and 13 of the hull near their lower ends and adapted to emit high velocity jets of water or air rearwardly into the water (or above the water if desired) to drive the boat by jet action. Each of the skis may contain a water pump 24 taking suction from the underside of the corresponding ski through a water *inlet* opening 25, and pumping water through the nozzle 23. An engine diagrammatically represented at 26 drives the two pumps 24, and can be controlled to drive the pumps at different rates to emit water at higher velocity through either of the jet nozzles as desired to attain a steering action. Alternatively, or in conjunction with this steering action, the two jets 23 may be vectored to allow turning of the jets laterally about vertical axes, by a control diagrammatically represented at 27, to steer the craft in that way.

To bridge the gap between the two skis 12 and 13 at relatively low and intermediate planing speeds, there are provided at the inner sides of these two skis a pair of planing flaps 28 and 29 which are movably connected to the lower extremities of the side walls 18 and 19 of the skis by a pair of elongated hinges 30 and 31 extending between the locations 21 and 22 of FIG. 1. These hinges mount the flaps to swing between the full line and broken line positions of FIGS. 1 and 2, about two parallel hinge axes 32 and 33 which extend parallel to the main longitudinal axis 17 of the craft. The flaps 28 and 29 are of essentially identical elongated rectangular configuration, and have parallel free edges 34 which meet at the location 35 in the full line positions of the flaps, to thereby extend across and completely close the underside of recess 16. In their retracted positions, the flaps extend vertically upwardly adjacent inner side walls 18 and 19 of the skis. The flaps 20 are power actuable between their full line and broken line positions of the figures, as by an electric, hydraulic or pneumatic motor represented at 36 in FIG. 2, actuating the flaps through mechanical drives represented at 37, under the control of a manually actuated control unit represented at 38. Desirably, this control system actuates the flaps upwardly and downwardly in unison.

To now describe the operation of the boat of FIGS. 1 and 2, assume that the boat is initially at rest in the water, and that the flaps 28 and 29 are in their full line essentially horizontal lowered positions of the figures. When the boat is thus stationary in the water, the hull is supported in its displacement mode, with skis 12 and 13 projecting downwardly into the water to a substantial depth. If the operator of the boat then commences operation of water pumps 24, to emit water rearwardly from nozzles 23, the boat will begin to move forwardly in the water, and as the speed increases will gradually rise on the water by virtue of the planing contact of the undersurfaces 14 and 15 of the skis and the undersurfaces of the flaps with the upper surface of the water. Thus, at these speeds, a composite planing surface of very substantial area extending across the entire underside of the boat is presented to the upper surface of the water, to exert a substantial upward force for raising the boat in the water. When the craft reaches a predetermined high speed, the operator actuates control 38 to swing flaps 28 and 29 upwardly to their broken line positions of FIGS. 1 and 2, in which only the undersurfaces of skis 12 and 13 are in contact with the upper surface of the water, and the top 20 of hull recess 16 is located well above the waterline. The greatly reduced wetted area presented by the skis in this condition minimizes drag on the boat, and also minimizes the upward force which will be exerted on the boat upon contact with waves, thereby attaining a very smooth and efficient mode of travel.

FIGS. 3 and 4 show an arrangement which is very similar to that of FIGS. 1 and 2, but in which the two flaps 28a and 29a for bridging across the recess 16a between ski portions 12a and 13a of hull 11a *carry* spray dams 39 for controlling the upward movement of water and spray within recess 16a in the retracted positions of the flaps. Except for the provision of dams 39, the two flaps 28a and 29a may be identical with flaps 28 and 29 of FIGS. 1 and 2, and may be mounted by hinges 30a and 31a whose pivotal axes are parallel to one another and parallel to the front to rear axis 17a of the boat. The flaps are actuable between the broken line and full line positions of [FIGS] *FIG.* 4 by a motor 36a through mechanical drives 37a and under the control of a manual control unit 38a.

Each of the dam elements 39 may be formed intergrally with and thus be rigidly connected to the corresponding flap element 28a or 29a, and is shaped to project beyond the axis of the corresponding hinge element 30a and 31a as seen in FIG. 4. The dams 39 may be essentially coplanar with elements 28a and 29a, and terminate in edges 40 of the two dams which are parallel to one another and parallel to axis 17a and the hinge axes of hinges 30a and 31a.

When the flaps 28a and 29a are in their broken line essentially horizontal positions of [FIGS] *FIG.* 4, the dams 39 are received within small recesses 41 formed in the [underside] *undersides* of skis 12a and 13a, so that the planar undersurfaces of the skis, flaps and dams are all aligned with one another and essentially coplanar and form together a composite planing surface for contacting the upper surface of a body of water and exerting upward force on the craft at fairly low speeds and during acceleration. When a predetermined high speed is attained, and the flaps are power actuated to their vertical full line positions of FIG. 4, this swinging movement of the flaps causes the dams to swing downwardly to their full line positions of FIG. 4 in which they project downwardly below the plane of undersurfaces 14a and 15a of the hull skis 12a and 13a, and below the hinges 30a and 31a. In this condition, the flaps prevent lateral movement of water and spray from beneath surfaces 14a and 15a into the hull recess 16a, and thereby prevent upward movement of water and spray along the inner sides of vertical flaps 28a and 29a and into the recess 16a.

FIGS. 5 through 8 show another hydro-ski craft 10b embodying the invention, and which craft is in certain respects similar to the hydro-ski boat disclosed in U.S. Pat. No. 3,308,780. More particularly, the boat of FIGS. 5 to 8 has a hull 11b to which two skis 42 are mounted for powered upward and downward shifting movement between the elevated or retracted positions illustrated in full lines in FIG. 5 and the downwardly extended broken line positions of that figure (see FIG. 6). As in that prior patent, the skis may be mounted for this movement by modified parallelogram struts 43, which are actuable to raise and lower the skis under the influence of hydraulic piston and cylinder mechanisms 44 controlled by the operator. The skis 42 may carry individual power plants 45 at their aft ends, which power plants are receivable within recesses 46 formed in the hull at its opposite sides. Each of the power plants 45 may include an engine 47 driving a pump 48 which takes suction from the underside of the ski through an opening 49 and emits a jet of water rearwardly at high velocity through a nozzle 50, to cause forward advancement of the craft through the water.

To the inner edges of the two skis 42, there are mounted a pair of longitudinal flaps 28b and 29b which may be essentially the same as the flaps 28 and 29 of FIG. 1, and which are mounted movably to the skis by individual elongated hinges 30b and 31b. In the horizontally extending full line positions of flaps 28b and 29b, these flaps are receivable against the undersurface 51 of the hull 11b, and have their planar undersurfaces aligned and coplanar with the planing undersurfaces 14b of skis 42. The flaps 28b and 29b are actuable through 90° relative to skis 42 by appropriate drive mechanisms, including a motor diagrammatically represented at 36b and acting against the flaps through mechanical connections 37b at the locations of hinges 30b and 31b. Appropriate controls 38b and 52 are accessible to the operator of the craft for actuating the flaps 28b and 29b upwardly and downwardly in unison relative to the skis, and for actuating the skis with the flaps upwardly and downwardly in unison relative to the hull.

When the boat of FIGS. 5 to 8 is stationary in the water, the skis 42 and flaps 28b and 29b are in their elevated positions of FIG. 7, in which the flaps are closely adjacent and in contact with the underside of the hull, and present planing undersurfaces which are coplanar with and form in effect continuations of the [planning] *planing* undersurfaces of the skis. The craft is initially supported in its displacement mode, and then as forward motion is commenced tends to rise in the water under the planing effect attained by engagement of the composite undersurface of the skis and flaps with the upper surface of the water. When a predetermined high speed is attained, the skis 42 are actuated downwardly to their FIG. 8 positions (broken lines in FIG. 5), and the flaps are swung upwardly about their parallel longitudinal hinge axes to their vertical upwardly projecting positions of FIG. 8. In this condition, the undersurface 51 of the hull is located well above the waterline, and does not contact the surface of the water, and therefore substantial load alleviation is attained by minimization of the effective area of the planing surfaces. The flaps 28b and 29b are no longer functioning as planing surfaces, but instead serve a secondary function of blocking off lateral movement of water across the upper sides of the skis, and past or through struts 43, thereby protecting the struts against excessive contact with the water. The flaps 28b and 29b can also be provided with dams, as shown at 39 in FIG. 4.

The final form of the invention, shown in FIGS. 9 to 12, is a pontoon type hydro-ski craft 10c, in which the hull 11c movably carries two elongated pontoons or floats 42c, which are generally pivotally mounted at their forward ends and with the aft ends being actuated by power means such as piston and cylinder mechanisms represented at 44c. In the elevated or retracted position, the pontoon skis are located high enough to enable the hull and skis to simultaneously plane along the upper surface of the water and function as a composite planing hull giving very substantial initial lift to the craft. When high speed is attained, the aft ends of the pontoons are actuated downwardly relative to the hull, in which only the pontoons contact and plane along the upper surface of the body of water, while the hull 11c is completely out of contact with the water, to minimize the resistance to forward movement.

As seen in FIG. 12, the buoyant pontoons are typically illustrated as having planing undersurfaces 53 of V-shaped transverse cross-section, having first portions 54 inclined upwardly and outwardly in one direction, and second portions 55 oppositely inclined. These surfaces 54 and 55 may merge along their outer edges with a pair of vertical parallel opposite side surfaces 56 of the pontoon, and all of these various surfaces may be curved at their forward ends to form a rounded nose portion 57' of the float.

At the opposite sides of each pontoon, there are provided a pair of flaps 57, which are mounted by elongated hinges 58 extending along the lower edges of surfaces 56 for swinging movement between the full line retracted and broken line active positions of FIG. 12. The pivotal axes of hinges 58 are parallel to one another, and disposed essentially horizontally, and parallel to the direction of forward movement of the craft. Each of the flaps 57 in its broken line active position has a planing surface 59 which is aligned and coplanar with the corresponding [under-surface] *undersurface* 54 or 55 of the float, and forms in effect a continuation thereof, with a spray dam portion 60 of the flap being received within an elongated recess or groove 61 formed in the float body. In the retracted upwardly projecting full line positions of flaps 57, the dams 60 project downwardly generally perpendicular to surfaces 54 and 55 respectively, to block upward and outward movement of water along surfaces 54 and 55, and prevent movement of that water upwardly along the outer surfaces of the upwardly projecting flaps and along the vertical side surfaces 56 of the pontoon.

Extending about the forward nose portion 57' of each pontoon, there may be provided a permanent rigid spray dam 62, which is disposed at a downward and outward angularity corresponding to that of the dams 60 in their active full line positions of [FIGS] *FIG.* 12, so that when the flaps are in their upwardly projecting condition, the movable dams 60 form continuations of dam 62, to prevent movement of spray or water upwardly along the sides of the pontoon through its entire length.

In bringing the craft 10c of FIGS. 9 to 12 up to speed, the pontoons 42c are as discussed initially in the upwardly or retracted position, and the flaps 59 are in their upwardly and outwardly inclined active positions (broken lines in FIG. 12). The pontoons and hull 11c are initially supported in the displacement mode, and as the craft commences to move forwardly in the water, they convert gradually to a planing mode in which all three of these elements contact and skim along the surface of the body of water. In this mode, the planing effect is enhanced by addition of the area of the undersurfaces of flaps 57 to the other planing surfaces, to thereby attain a very high lift force. When the speed reaches a predetermined value, ski pontoons 42c are actuated downwardly to the positions of FIG. 9, to raise the hull out of the water; and ultimately the flaps 57 are swung upwardly to their full line retracted positions of FIG. 12, in which dams 60 are automatically moved to their active positions for blocking upward movement of spray or water along the sides of the pontoons. In this way, drag is minimized, and the efficiency of travel through the water is maximized, and at the same time the susceptibility of the craft to overturning or damage by wave action at high speed is decreased by reduction of the area of the wetted surfaces to only the undersides of the pontoons themselves.

While certain specific embodiments of the present invention have been disclosed as typical, the invention is of course not limited to these particular forms, but rather is applicable broadly to all such variations as fall within the scope of the appended claims.

We claim:

1. A hydro-ski craft comprising:

a hull;

powered means for advancing said hull in a predetermined forward direction along a body of water;

means carried by said hull forming a downwardly facing planing surface adapted to engage and plane along the upper surface of said body of water;

an auxiliary planing element having a planing surface and mounted for movement between an active position in which said planing surface thereof is located to contact and plane along the upper surface of a body of water and supplement the load supporting effect of said first mentioned planing surface, and an upwardly retracted position; and a spray dam attached to and movable with said auxiliary planing element between a *dam* retracted position and [an active] *a dam active* position in which it [is located] *protrudes downwardly relative to its said dam retracted position* to block upward movement of water when said auxiliary planing element is in its *said upwardly* retracted position.

2. A hydro-ski craft as recited in claim 1, including means operatively connecting said dam to said auxiliary planing element for movement of said dam from its retracted position to its active position in response to movement of said auxiliary planing element between its active and retracted positions.

3. A hydro-ski craft as recited in claim 1, in which there are two of said auxiliary planing elements toward opposite sides respectively of said hull and both mounted for upward and downward movement between active and retracted positions, and two of said dams associated with the two auxiliary planing elements respectively.

4. A hydro-ski craft as recited in claim 1, including hinge means mounting said auxiliary planing element for upward and downward swinging movement between said positions thereof and about an axis extending generally parallel to said direction of travel of the hull.

5. A hydro-ski craft as recited in claim 1, in which said first mentioned planing surface is formed on the underside of said hull, said hull having a surface extending upwardly from an edge of said first mentioned planing surface, there being hinge means at essentially the juncture of said first mentioned planing surface and said upwardly extending surface mounting said auxiliary planing element to swing upwardly from said active position thereof to said inactive position, with said auxiliary planing element being received adjacent said upwardly extending surface of the hull in its inactive position, said spray dam being rigidly connected to said auxiliary planing element at essentially the location of said hinge means for swinging movement from retracted to active position in response to swinging movement of the auxiliary planing element from its active position to its retracted position.

6. A hydro-ski craft as recited in claim 5, in which said hull has two integral ski portions spaced laterally apart and having respectively two of said first mentioned planing surfaces with a recess formed in the hull therebetween, and with two of said upwardly extending surfaces formed on the hull at inner sides of the two ski portions, there being two of said auxiliary planing elements mounted pivotally to inner sides of said ski portions to swing between lower active and upper retracted positions, and there being two of said spray dams carried rigidly by said two auxiliary planing elements respectively for swinging movement therewith.

7. A hydro-ski craft as recited in claim [1] *5*, in which there are two of said auxiliary planing elements mounted by two of said hinge means at opposite sides of said first mentioned planing surface for swinging movement between lower active and upwardly projecting retracted positions, and two of said spray dams carried rigidly by said two auxiliary planing elements respectively for swinging movement therewith.

8. A hydro-ski craft comprising:

a hull having two laterally spaced skis with planing undersurfaces spaced laterally apart *for supporting the craft at high speeds solely by means of said skis*; and flap means movable relative to said hull and mounted for upward and downward swinging movement relative to said planing undersurfaces between a lower active position and upper retracted position;

said flap means in said active position being approximately aligned with said undersurfaces of the skis in a relation supplementing the planing effect thereof, and extending across and [bringing] *bridging* substantially the entire space laterally between said undersurfaces of the skis.

9. A hydro-ski craft as recited in claim 8, in which said two spaced skis as integral portions of said hull with a recess therebetween bridged by said flap means.

10. A hydro-ski craft as recited in claim 8, in which said skis are mounted for upward and downward movement relative to said hull.

11. A hydro-ski craft as recited in claim 8, in which said flap means include two longitudinal flaps hinged to inner edges of said skis respectively for swinging movement about [esentially] *essentially* longitudinal axes, and projecting toward one another and into close proximity with one another in said active position.

12. A hydro-ski craft comprising:

a hull having two [internal] *integral* ski portions spaced laterally apart and having downwardly facing planing surfaces *for supporting the craft at*

*high speeds solely by means of said ski portions*, with a recess extending upwardly into the hull between said [skis] *ski portions* and between said planing surfaces; and at least one flap mounted for upward and downward swinging movement about an axis extending essentially longitudinally of the hull and between a lower active position of extension at least partially across the space between said planing undersurfaces of the ski portions of the hull *to form a relatively large composite planing surface for low speeds*, and an upwardly retracted position into said recess.

13. A hydro-ski craft as recited in claim 12, in which there are two of said flaps hinged to inner sides of said ski portions respectively of the hull for swinging movement about two of said longitudinal axes between active positions in which they project toward one another and retracted positions of extension upwardly near the two skis respectively.

14. A hydro-ski craft as recited in claim 13, including two spray control dams carried by said flaps near said axes thereof and for swinging movement with the flaps between inactive positions and projecting active positions blocking upward movement of water toward said flaps when the flaps are in their upwardly projecting retracted positions.

15. A hydro-ski craft comprising:

a hull;

at least one ski having a planing undersurface;

means for actuating said ski upwardly and downwardly relative to said hull;

an auxiliary planing flap carried by and movable relative to said ski; and hinge means connecting said flap to said ski for movement upwardly and downwardly therewith relative to the hull and for swinging movement relative to the ski about an axis extending essentially longitudinally of the hull and between a lower active position in which the flap projects generally horizontally at approximately the level of said planing surface of the ski to supplement its planing effect, and an upwardly swung position, whereby said ski is alternatively positioned in a first position coplanar with said hull and a second downwardly extended position.

16. A hydro-ski craft as recited in claim 15, in which said flap in said upwardly swung position is laterally opposite said means for actuating the ski upwardly and downwardly to restrict *lateral* flow of water past the upper side of the ski and past said means.

17. A hydro-ski craft as recited in claim 15, in which said hull has a downwardly facing undersurface adjacant which said ski and flap are both received in the upwardly retracted position of the ski.

18. A hydro-ski craft comprising:

a hull;

two skis *spaced* laterally apart and having planing surfaces at their undersides defining at least a portion of the primary operational support surfaces for said craft;

means for actuating said skis upwardly and downwardly relative to said hull between upper retracted positions and lower active positions;

two longitudinal flaps movably connected to inner sides of said skis respectively;

hinges connecting said flaps to said inner sides of the skis repectively for swinging movement about two spaced essentially longitudinal axes and between upper positions in which the two flaps are positioned adjacent said hull and project toward one another at essentially the level of said skis and vertically oriented, spray-blocking positions; and means for actuating said flaps between said positions thereof.

19. A hydro-ski craft as recited in claim 18, in which said hull has an undersurface adjacent which both of said skis and both of said flaps are received in the upwardly retracted positions of the skis.

20. A hydro-ski craft as recited in claim 18, in which said means for actuating said skis upwardly and downwardly include struts projecting downwardly from said hull and movably supporting the skis, said flaps in their upwardly swung positions being located laterally opposite said struts in a relation at least partially blocking water flow laterally past said struts.

21. A hydro-ski craft comprising:

a hull;

powered means for advancing said hull in a predetermined forward direction along a body of water;

means carried by said hull forming a downwardly facing planing surface adapted to engage and plane along the upper surface of said body of water;

an auxiliary planing element having a planing surface and mounted for movement between an active position in which said planing surface thereof is located to contact and plane along the upper surface of a body of water and supplement the load supporting effect of said first mentioned planing surface, and an upwardly retracted position;

hinge means mounting said auxiliary planing element for upward and downward swinging movement between said positions thereof and about an axis extending generally parallel to said direction of travel of the hull; and a spray dam movable between a retracted position and an active position in which it [is located] *protrudes downwardly relative to its said retracted position* to block upward movement of water when said auxiliary planing element is in its retracted position, said dam being rigidly connected to said auxiliary planing element for swinging movement therewith and from said retracted position thereof to said active position thereof in response to upward swinging movement of said auxiliary planing element from its active position to its *said upwardly* retracted position.

22. A hydro-ski craft comprising:

a hull;

two skis spaced laterally apart and having planing surfaces at their undersides;

means for actuating said skis upwardly and downwardly relative to said hull between upper retracted positions and lower active positions;

two longitudinal flaps movably connected to inner sides of said skis respectively;

hinges connecting said flaps to said inner sides of the skis respectively for swinging movement about two spaced essentially longitudinal axes and between lower active positions in which the two flaps project toward one another at essentially the level of said skis and upwardly swung retracted positions;

two spray control dams attached to said flaps for swinging movement therewith and acting when the flaps are in their upwardly swung positions to block upward flow of water along the flaps; and means for actuating said flaps between said positions thereof.

*23. A hydro-ski craft as recited in claim 9, in which said flap means comprising a flap extending longitudinally of the hull and having an auxiliary planing surface.*

*24. A hydro-ski craft as recited in claim 23 in which, when said flap is in said active position, it forms with said planing undersurfaces of said ski portions a relatively large composite planing surface to adapt said craft for travel at a relatively low speed.*

* * * * *